(12) United States Patent
Yeh

(10) Patent No.: US 8,411,333 B2
(45) Date of Patent: Apr. 2, 2013

(54) IMAGE CAPTURING DEVICE

(75) Inventor: Ming Te Yeh, Taoyuan (TW)

(73) Assignee: TECO Image System Co., Ltd, Taipei (TW)

( * ) Notice: Subject to any disclaimer, the term of this patent is extended or adjusted under 35 U.S.C. 154(b) by 454 days.

(21) Appl. No.: 12/768,828

(22) Filed: Apr. 28, 2010

(65) Prior Publication Data

US 2011/0149356 A1    Jun. 23, 2011

(30) Foreign Application Priority Data

Dec. 17, 2009 (TW) .............................. 98143257 A

(51) Int. Cl.
*H04N 1/04* (2006.01)

(52) U.S. Cl. ........ 358/475; 358/474; 358/509; 358/498; 382/254; 382/275

(58) Field of Classification Search .................. 358/474, 358/486, 497, 496, 498, 501, 475, 509; 382/254, 382/275, 167, 274

See application file for complete search history.

(56) References Cited

U.S. PATENT DOCUMENTS

| | | | | |
|---|---|---|---|---|
| 4,475,128 A | * | 10/1984 | Koumura | 358/296 |
| 4,743,974 A | * | 5/1988 | Lockwood | 358/494 |
| 5,488,485 A | * | 1/1996 | Amemiya | 358/444 |
| 5,751,438 A | * | 5/1998 | Murai et al. | 358/403 |
| 6,172,774 B1 | * | 1/2001 | Yamashita | 358/474 |
| 6,333,795 B1 | * | 12/2001 | Kaji | 358/474 |
| 6,760,131 B2 | * | 7/2004 | Kaji | 358/474 |
| 7,248,378 B2 | * | 7/2007 | Shiraishi | 358/1.13 |
| 7,450,278 B2 | * | 11/2008 | Nakazawa | 358/504 |
| 7,511,864 B2 | * | 3/2009 | Muzzin et al. | 358/496 |
| 7,515,772 B2 | * | 4/2009 | Li et al. | 382/289 |
| 7,612,925 B2 | * | 11/2009 | Tseng | 358/496 |
| 7,619,785 B2 | * | 11/2009 | Sodeura et al. | 358/474 |
| 7,626,735 B2 | * | 12/2009 | Mizuhashi et al. | 358/474 |
| 7,847,988 B2 | * | 12/2010 | Hayashide | 358/506 |
| 8,040,575 B2 | * | 10/2011 | Eom et al. | 358/474 |
| 8,335,021 B2 | * | 12/2012 | Tanaka et al. | 358/461 |
| 2005/0206968 A1 | * | 9/2005 | Sodeura et al. | 358/474 |
| 2006/0268367 A1 | * | 11/2006 | Hayashide | 358/474 |

* cited by examiner

*Primary Examiner* — Negussie Worku
(74) *Attorney, Agent, or Firm* — Rabin & Berdo, P.C.

(57) ABSTRACT

An image capturing device includes: a first base, including a first side edge and a second side edge opposite to each other; a first light-emitting element, located at the first side edge, for emitting a first light source to illuminate a document; a first compensator, located at the second side edge; a first sensing element, located between the first light-emitting element and the first compensator; a first transparent sheet, covering the first compensator; a second base, including a third side edge and a fourth side edge opposite to each other; a second light-emitting element, located at the third side edge, for emitting a second light source to illuminate the document; a second compensator, located at the fourth side edge; a second sensing element, located between the second light-emitting element and the second compensator; and a second transparent sheet, covering the second compensator.

12 Claims, 5 Drawing Sheets

IMAGE CAPTURING DEVICE

CROSS-REFERENCES TO RELATED APPLICATIONS

This non-provisional application claims priority under 35 U.S.C. §119(a) on Patent Application No. 98143257 filed in Taiwan, R.O.C. on 2009/12/17, the entire contents of which are hereby incorporated by reference.

BACKGROUND OF THE INVENTION

1. Technical Field

The present invention relates to an image capturing device, and more particularly to an image capturing device for dual-side scanning.

2. Related Art

With the development of information technology, an increasing amount of information has become available, and electronic products have gradually become indispensable to daily life. In recent years, scanners for reading planar images have also become an important peripheral device.

In the prior art shown in FIG. 1, in order to achieve higher image-scanning quality the structure of a currently commercially available scanner is changed, so as to prevent light rays of an opposite light source from entering a sensor, thereby resulting in poor image quality. In this prior art, an original manuscript paper is placed between an original manuscript pressing roller a1 and a glass cover a2 of an image sensor. This structure includes two systems disposed vertically opposite to each other. However, this structural design wastes space, because the two opposite systems are horizontally spaced from each other. Even worse, the paper feed rollers a3 of such structural design are spaced at an excessively large distance, and cannot therefore move small pieces of paper for scanning.

Moreover, in the prior art shown in FIG. 2, in order to improve the image quality compensators b1 are additionally provided on the scanner, so as to compensate for the sensor. However, in this structure, the compensators b1 are mostly exposed to the paper passage, so that when the paper passes through the paper passage the compensators are easily contaminated by paper debris or ink, thereby deteriorating the image quality. Furthermore, since the compensators b1 are not protected in any way, the compensators b1 must be cleaned at regular intervals, so as to prevent the compensators b1 from excessive contamination. However, this structure is not easily cleaned, and the compensators b1 are easily scratched during cleaning.

The image capturing device of the present invention changes positions for disposing the compensators and additionally provides transparent sheets to protect the compensators from being contaminated or damaged, so as to solve the problem in the prior art that the compensators are easily contaminated and damaged and thus cannot work properly.

SUMMARY

Accordingly, the present invention provides an image capturing device, which is disposed on a dual-side scanner. The image capturing device includes: a first base, including a first side edge and a second side edge opposite to each other; a first light-emitting element, located at the first side edge in the first base, for emitting a first light source to illuminate a document, so as to produce a first reflected light ray reflected by the document; a first compensator, located at the second side edge in the first base; a first sensing element, located in the first base and located between the first light-emitting element and the first compensator, for receiving the first reflected light ray; a first transparent sheet, covering the first compensator to protect the first compensator; a second base, including a third side edge and a fourth side edge opposite to each other; a second light-emitting element, located at the third side edge in the second base, for emitting a second light source to illuminate the document, so as to produce a second reflected light ray reflected by the document; a second compensator, located at the fourth side edge in the second base; a second sensing element, located in the second base and located between the second light-emitting element and the second compensator, for receiving the second reflected light ray; and a second transparent sheet, covering the second compensator to protect the second compensator. The first compensator adjusts an image difference of the second sensing element, and the second compensator adjusts an image difference of the first sensing element.

In the present invention, the compensators are disposed in the bases to perform optical compensation for the opposite bases, and the transparent sheets are used to protect the compensators, so that the present invention not only solves the problem in the prior art that the compensators are easily contaminated, but also solves the problem of waste of the structural space in the scanner, since the compensators are disposed in the bases.

DETAILED DESCRIPTION

Figure 1:
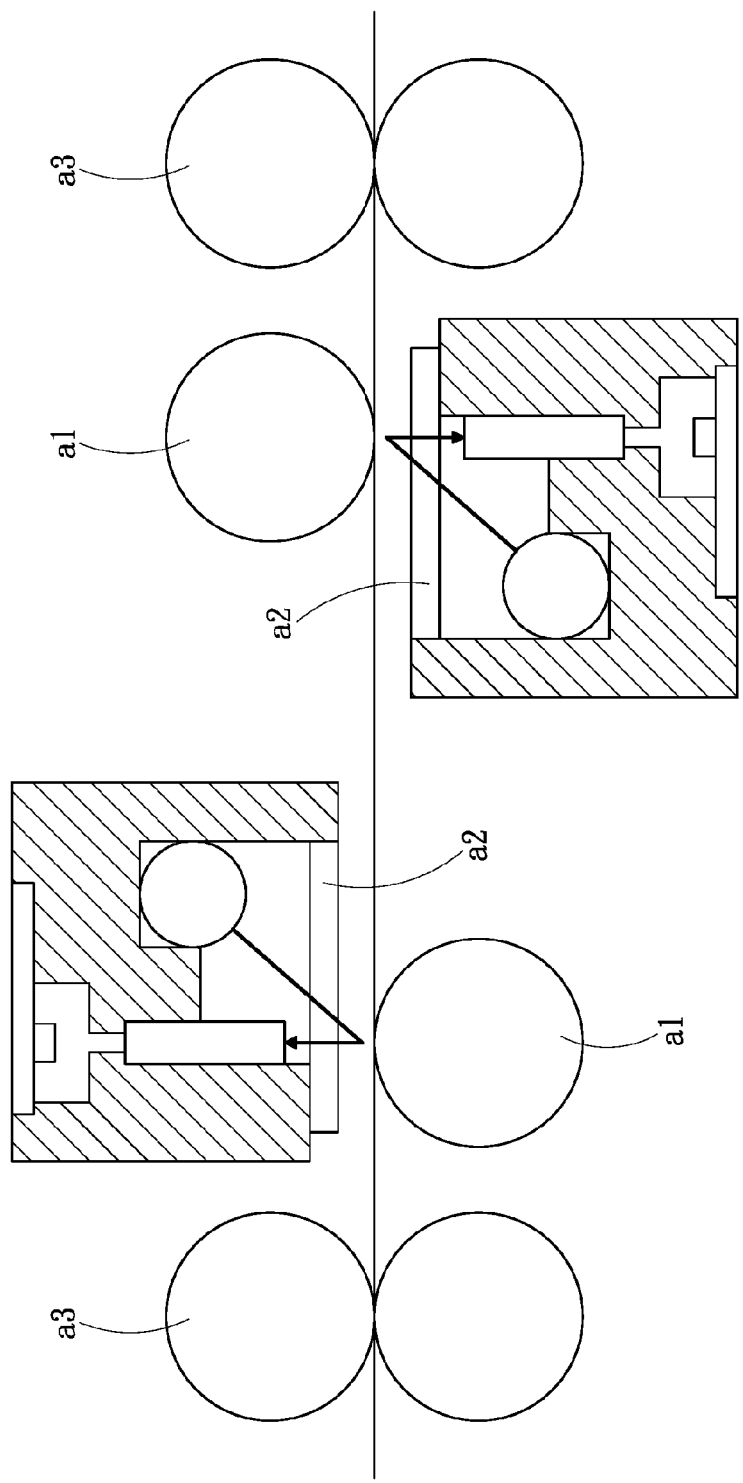
FIG. 1 is a structural view of a scanner in the prior art.
Figure 2:
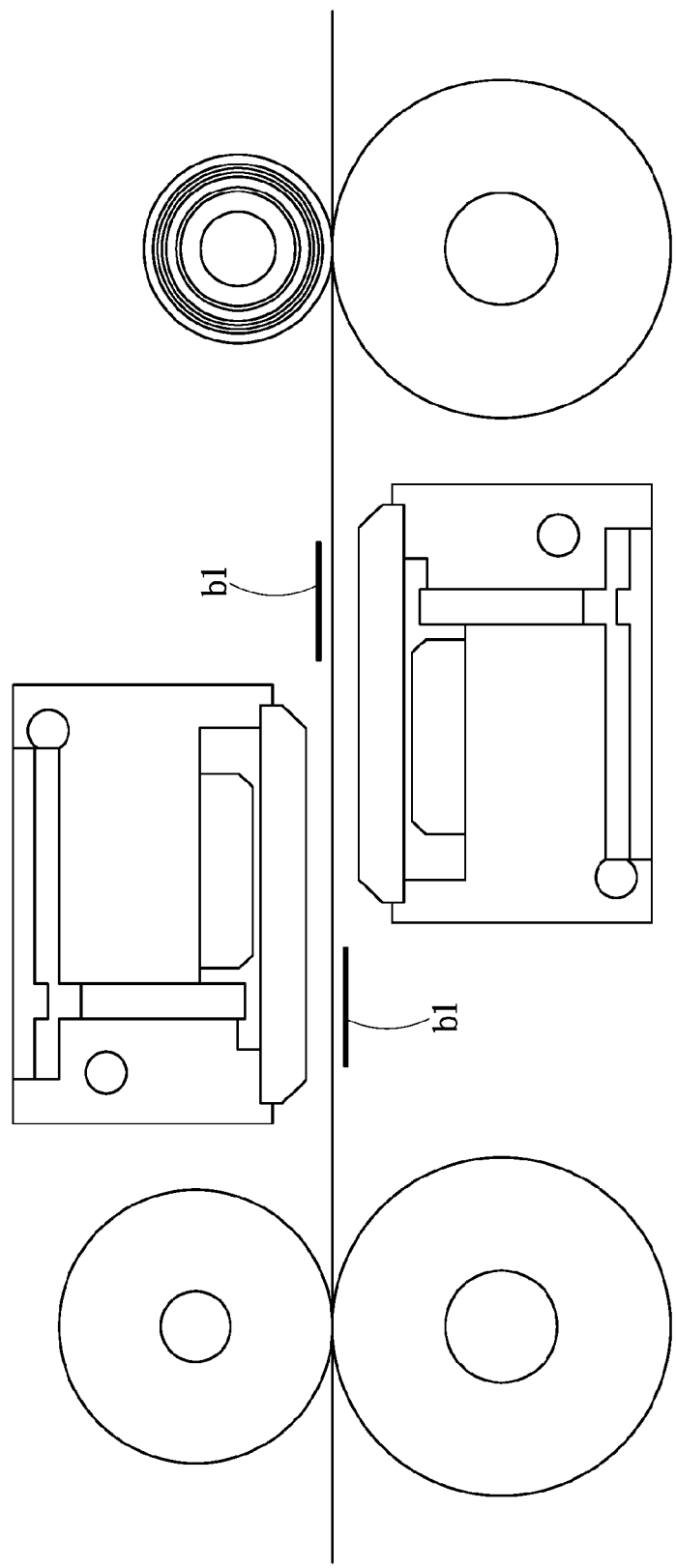
FIG. 2 is a structural view of exposed compensators in the prior art.
Figure 3:
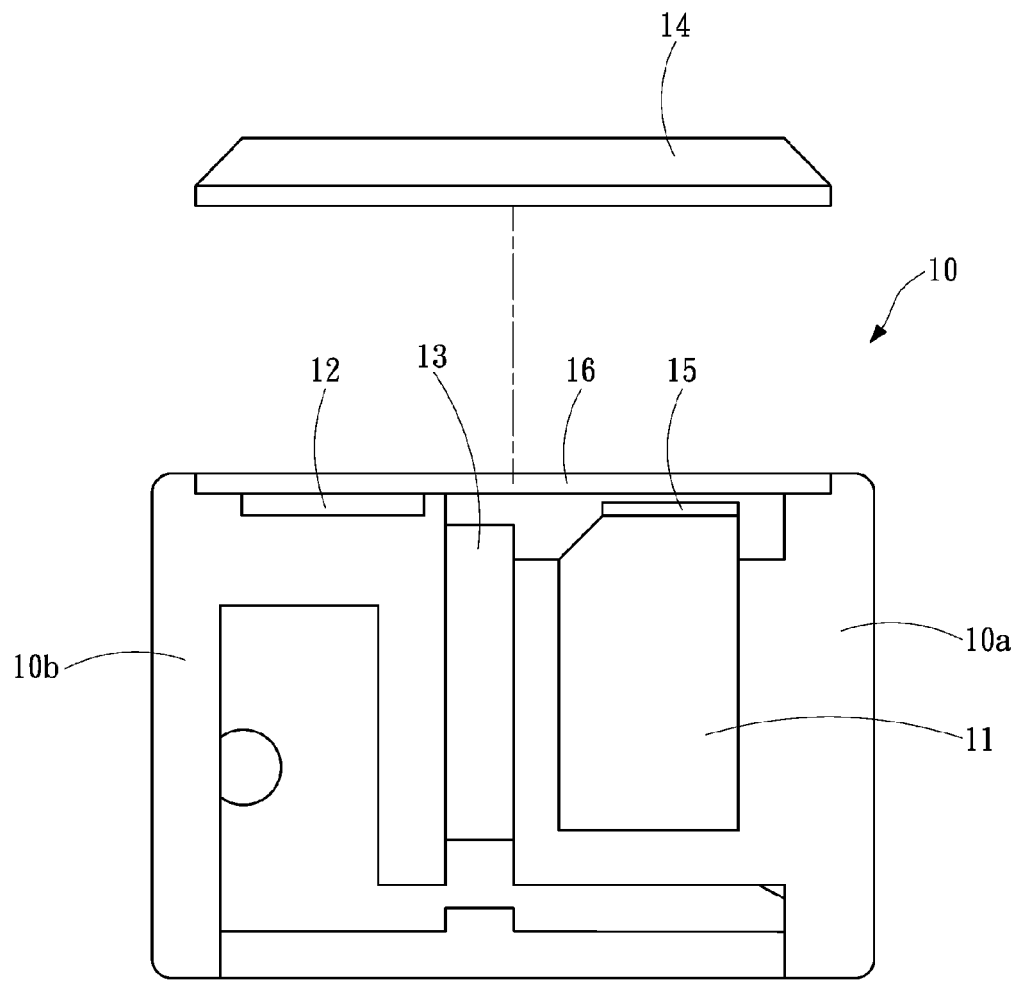
FIG. 3 is an overall structural view of the present invention.
Figure 4:
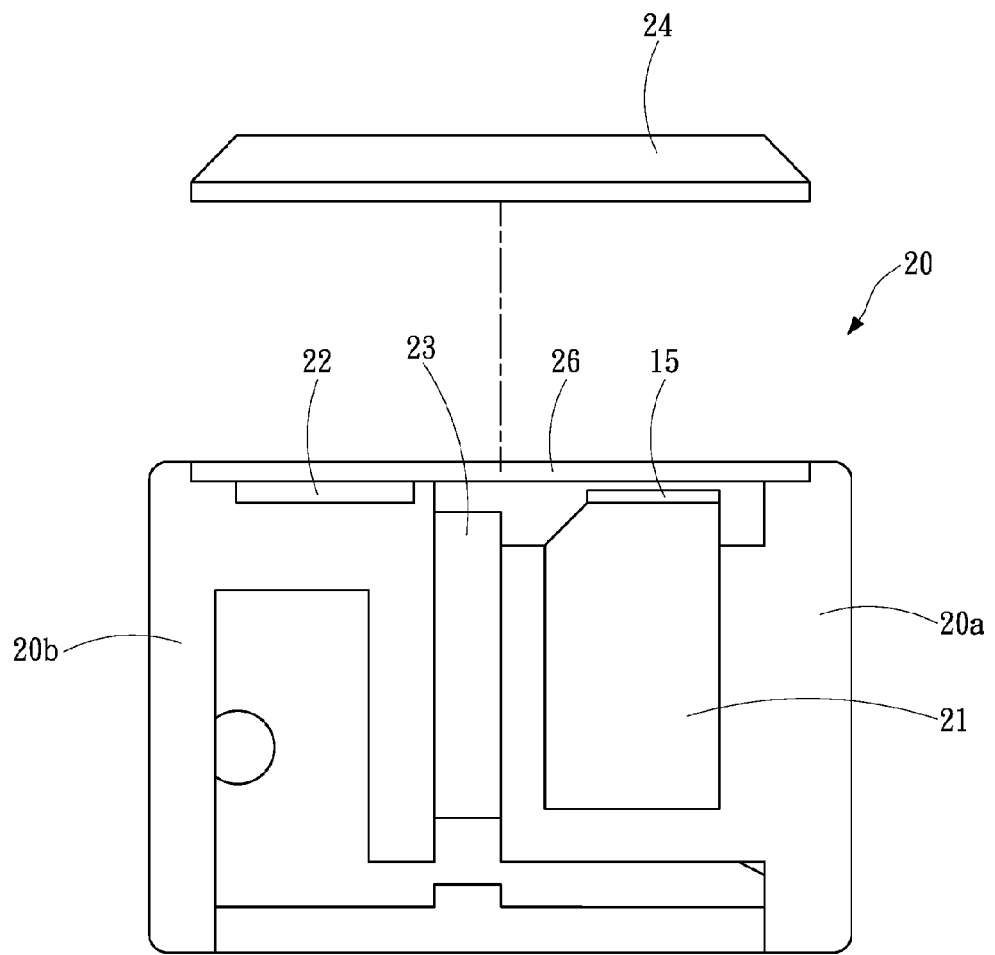
FIG. 4 is a structural view of a first base of the present invention.
Figure 5:
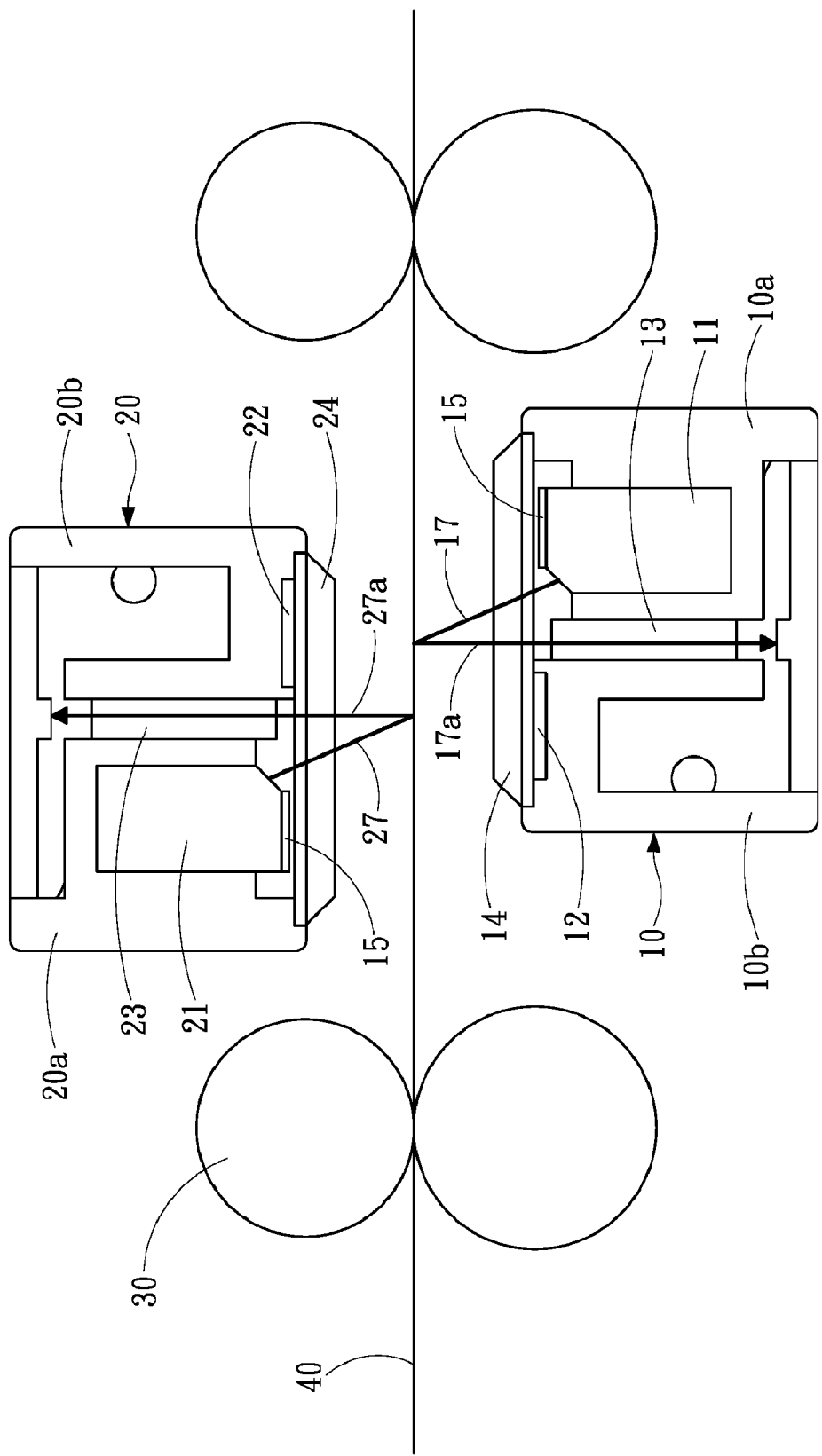
FIG. 5 is a structural view of a second base of the present invention.

Please refer to FIGS. 3, 4, and 5, in which an image capturing device according to an embodiment of the present invention is shown, which includes a first base 10, a first light-emitting element 11, a first compensator 12, a first sensing element 13, a first transparent sheet 14, a second base 20, a second light-emitting element 21, a second compensator 22, a second sensing element 23, and a second transparent sheet 24.

As shown in FIG. 3, the first base 10 is an approximately rectangular structure. The first base 10 includes a first side edge 10a and a second side edge 10b opposite to the first side edge 10a. In addition, the first base 10 has a first opening 16 on one side thereof. Moreover, the first base 10 further has an accommodating space therein. However, the rectangular structure is merely provided as an example, but the present invention is not limited thereto.

The first light-emitting element 11 is located at the first side edge 10a in the first base 10. The first light-emitting element 11 may be a cold-cathode tube or a light-emitting diode (LED), but the present invention is not limited thereto. In addition, the present invention further includes: a cover sheet 15, located in the first base 10 and adjacent to the first opening 16, and masking the first light-emitting element 11. The cover sheet 15 may be preferably made of an opaque material. The first compensator 12 is located at the second side edge 10b in the first base 10, and disposed adjacent to the first opening 16. The first compensator 12 may be made of a black material or a white material. Accordingly, the first sensing element 13 is located in the first base 10 and located between the first light-emitting element 11 and the cover sheet 15. The first sensing element 13 may be preferably a self-focusing lens, but the present invention is not limited thereto.

The first transparent sheet 14 is located at the first opening 16 of the first base 10, and covers the first compensator 12 to protect the first compensator 12 from being contaminated by paper debris or ink, so that the first compensator 12 is prevented from being stained. In this embodiment, the area covered by the first transparent sheet 14 also includes both the first light-emitting element 11 and the first sensing element 13. The first transparent sheet 14 is an approximately rectangular sheet structure, and is made of a light transmissive material. The first transparent sheet 14 may be preferably made of a glass, but the present invention is not limited thereto.

As shown in FIG. 4, the second base 20 is an approximately rectangular structure. The second base 20 includes a third side edge 20a and a fourth side edge 20b opposite to the third side edge 20a. In addition, the second base 20 has a second opening 26 on one side thereof. Moreover, the second base 20 further has an accommodating space therein. However, the rectangular structure is merely provided as an example, but the present invention is not limited thereto.

The second light-emitting element 21 is located at the third side edge 20a in the second base 20. The second light-emitting element 21 may be a cold-cathode tube or an LED, but the present invention is not limited thereto. In addition, the present invention further includes a cover sheet 15, located in the second base 20 and adjacent to the second opening 26, and masking the second light-emitting element 21. The cover sheet 15 may be preferably made of an opaque material. The second compensator 22 is located at the fourth side edge 20b in the second base 20, and disposed adjacent to the second opening 26. The second compensator 22 may be made of a black material or a white material. Accordingly, the second sensing element 23 is located in the second base 20 and located between the second light-emitting element 21 and the cover sheet 15. The second sensing element 23 may be preferably a self-focusing lens, but the present invention is not limited thereto.

The second transparent sheet 24 is located at the second opening 26 of the second base 20, and covers the second compensator 22 to protect the second compensator 22 from being contaminated by paper debris or ink, so that the second compensator 22 is prevented from being stained. In this embodiment, the area covered by the second transparent sheet 24 includes both the second light-emitting element 21 and the second sensing element 23. The second transparent sheet 24 is an approximately rectangular sheet structure, and is made of a light transmissive material. The second transparent sheet 24 may be preferably made of a glass, but the present invention is not limited thereto.

As shown in FIG. 5, in the present invention, the first base 10 and the second base 20 are disposed opposite to each other, so that the first compensator 12 in the first base 10 and the second sensing element 23 in the second base 20 are at opposite positions, and meanwhile, the second compensator in the second base 20 and the first sensing element in the first base 10 are also at opposite positions.

In addition, the image capturing device of the present invention further includes a transport module 30, and the transport module 30 is an approximately cylindrical structure. The transport module 30 may be preferably a roller, but the present invention is not limited thereto. In this embodiment, the transport module 30 is four rollers configured as two adjacent pairs, which are respectively disposed on two sides of the first base 10 and the second base 20 that are disposed opposite to each other.

When a user intends to use the image capturing device of the present invention, a document 40 is firstly placed between the adjacent transport modules 30. Then, upon being driven by a friction force between the transport module 30 and the document 40 caused by rolling of the transport module 30, the document 40 reaches a position between the first base 10 and the second base 20. After the document 40 reaches the position between the first base 10 and the second base 20, the first light-emitting element 11 and the second light-emitting element 21 respectively emit a first light source 17 and a second light source 27 to illuminate the document 40. Accordingly, the cover sheet 15 in the first base 10 and in the second base 20 respectively cover the first light-emitting element 11 and the second light-emitting element 21, such that the first light source 17 and the second light source 27 cannot pass through the cover sheet 15, and can only be diffused in a fixed direction.

Accordingly, after the first light source 17 illuminates the document 40, a first reflected light ray 17a is produced, and the first sensing element 13 receives the first reflected light ray 17a. Meanwhile, the second compensator 22 performs optical compensation for the first sensing element 13 to adjust an image difference. For example, when the first light source 17 has been used for a long time, the color difference may occur to the emitted light rays as the time elapsed. For example, the luminance of the LED red light achieved when the LED is turned on is different from that achieved after the LED has worked for a certain time period. Through the optical compensation of the second compensator 22, the LED red light can be adjusted to the luminance achieved when the LED is turned on. After the second light source 27 illuminates the other side of the document 40, a second reflected light ray 27a is produced, and the second sensing element 23 receives the second reflected light ray 27a. Meanwhile, the first compensator 12 performs optical compensation for the second sensing element 23 to adjust an image difference. The adjustment performed by the first compensator 12 is similar to that described above, so the details will not be described herein again.

By changing the position configuration of the compensators and using the transparent sheets to protect the compensators, the present invention solves the problem in the prior art that the structural design wastes the space in order to avoid affecting the image quality. In addition, by covering the transparent sheets on the compensators, the present invention not only protects the compensators, but also eliminates the trouble caused by cleaning the compensators.

While the present invention has been described by the way of example and in terms of the preferred embodiments, it is to be understood that the invention need not to be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:
1. An image capturing device, disposed on a dual-side scanner, the image capturing device comprising:
  a first base, comprising a first side edge and a second side edge opposite to each other;
  a first light-emitting element, located at the first side edge in the first base, for emitting a first light source to illu- minate a document, so as to produce a first reflected light ray reflected by the document;

a first compensator, located at the second side edge in the first base;

a first sensing element, located in the first base and located between the first light-emitting element and the first compensator, for receiving the first reflected light ray;

a first transparent sheet, covering the first compensator to protect the first compensator;

a second base, comprising a third side edge and a fourth side edge opposite to each other;

a second light-emitting element, located at the third side edge in the second base, for emitting a second light source to illuminate the document, so as to produce a second reflected light ray reflected by the document;

a second compensator, located at the fourth side edge in the second base;

a second sensing element, located in the second base and located between the second light-emitting element and the second compensator, for receiving the second reflected light ray; and a second transparent sheet, covering the second compensator to protect the second compensator;

wherein the first compensator is configured to adjust an image difference of the second sensing element upon the receipt, by the second sensing element, of the second reflected light ray generated from the document illuminated by the second light source, and the second compensator adjusts is configured to adjust an image difference of the first sensing element upon the receipt, by the first sensing element, of the first reflected light ray generated from the document illuminated by the first light source.

2. The image capturing device according to claim 1, wherein the first base and the second base are disposed opposite to each other.

3. The image capturing device according to claim 2, wherein the first compensator and the second sensing element are at opposite positions.

4. The image capturing device according to claim 2, wherein the second compensator and the first sensing element are at opposite positions.

5. The image capturing device according to claim 1, further comprising: a cover sheet, for respectively, masking the first light-emitting element and the second light-emitting element, such that the first light source and the second light source are diffused in a fixed direction.

6. The image capturing device according to claim 1, wherein the first light-emitting element and the second light-emitting element are cold-cathode tubes.

7. The image capturing device according to claim 1, wherein the first compensator and the second compensator are made of a black material.

8. The image capturing device according to claim 1, wherein the first compensator and the second compensator are made of a white material.

9. The image capturing device according to claim 1, wherein the first sensing element and the second sensing element are self-focusing lenses.

10. The image capturing device according to claim 1, wherein the first transparent sheet and the second transparent sheet are made of a glass.

11. The image capturing device according to claim 1, further comprising: a transport module, for transporting the document to a position between the first base and the second base.

12. The image capturing device according to claim 11, wherein the transport module is a roller.

* * * * *